United States Patent [19]

Shibamoto

[11] Patent Number: 4,716,931

[45] Date of Patent: Jan. 5, 1988

[54] INTERNAL PARTS FIXING STRUCTURE FOR TANK

[75] Inventor: Yutaka Shibamoto, Atsugi, Japan

[73] Assignee: Nissan Motor Co., Ltd., Yokohama, Japan

[21] Appl. No.: 920,664

[22] Filed: Oct. 20, 1986

[30] Foreign Application Priority Data

Oct. 23, 1985 [JP] Japan .................................. 60-237094

[51] Int. Cl.$^4$ ........................................... F16M 11/00
[52] U.S. Cl. ................................... 137/558; 137/565; 137/590; 417/360; 248/121; 248/176; 123/509
[58] Field of Search ............... 137/558, 565, 590; 417/360, 363; 280/5 A; 123/509, 514; 248/121, 176

[56] References Cited

U.S. PATENT DOCUMENTS

| | | | |
|---|---|---|---|
| 612,097 | 10/1898 | Goodwin | 248/121 |
| 2,429,280 | 10/1947 | Scully et al. | 137/590 X |
| 2,840,147 | 6/1958 | Almstad | 137/590 X |
| 2,963,203 | 12/1960 | Hoelle | 417/363 X |
| 3,074,347 | 1/1963 | Clymer | 417/363 |
| 3,470,907 | 10/1969 | Shockey | 137/590 |
| 3,500,858 | 3/1970 | Metcalf | 137/590 X |
| 3,633,609 | 1/1972 | Benner et al. | 137/590 X |
| 4,306,844 | 12/1981 | Otto et al. | 417/360 X |
| 4,377,268 | 3/1983 | Wolford | 248/121 X |

FOREIGN PATENT DOCUMENTS

| | | | |
|---|---|---|---|
| 1221912 | 7/1966 | Fed. Rep. of Germany | 137/590 |
| 2750081 | 5/1979 | Fed. Rep. of Germany | 137/590 |
| 2844053 | 4/1980 | Fed. Rep. of Germany | 123/509 |
| 59-156822 | 9/1984 | Japan . | |

*Primary Examiner*—Martin P. Schwadron
*Assistant Examiner*—John Rivell
*Attorney, Agent, or Firm*—Schwartz, Jeffery, Schwaab, Mack, Blumenthal & Evans

[57] ABSTRACT

A structure for supporting a member in a tank made of resin and having an opening in the upper wall thereof comprises a fixing bracket having a base portion made of resin and secured by heat to the lower wall of the tank generally just below the opening of the tank. The fixing bracket further has a support portion extending from the base portion and supporting the member in a state in which the position of the member is offset from the opening of the tank.

6 Claims, 4 Drawing Figures

INTERNAL PARTS FIXING STRUCTURE FOR TANK

BACKGROUND OF THE INVENTION

The present invention relates to a fixing structure for parts that are disposed within a fuel tank of motor vehicles or the like.

In several fuel tanks made of resin that are used for motor vehicles or the like, such as a fuel tank 41 shown in FIG. 1, the tank is arranged to fix functional internal parts, such as a fuel gauge, to the interior of the tank body 42. For instance, in fixing a fuel gauge 43, a service opening 44 is formed in the top wall 42a of the tank body 42, and a fuel gauge 43 is inserted through the service opening 44. Then, a lid 45 which is attached to the top of the fuel gauge 43 is fixed to the service opening 44 via a packing 46, and the lid 45 is tightly fixed to the service opening 44 with a cap 47. (A similar structure is disclosed, for example, in Japanese Laid-open Patent No. 59-156822.)

Due to the circumstance that various kinds of tubes are to be inserted into the fuel tank 41 and a buffer plate and other parts are to be attached to it, the positions for fixing the internal functional parts such as fuel gauge 43 within the fuel tank 41 are necessarily limited. The possible positions are further limited due to the geometry of the fuel tank and the position of the service opening 44. Accordingly, it has become evident that the installation of functional internal parts will be difficult when the position of the service opening 44 and the position of the fuel gauge 43 are offset each other.

SUMMARY OF THE INVENTION

Thus, an object of the present invention is to provide an internal parts fixing structure for a tank which makes it possible to fix functional internal parts to the tank, and moreover, which facilitate the installation work, even when the fixing positions of the functional internal parts of the tank are significantly offset from the service opening.

With the above object in view, the present invention resides in a structure for supporting a member in a tank made of resin and having an opening in the upper wall thereof, the structure comprising a fixing bracket having a base portion made of resin and secured by heat to the lower wall of the tank generally just below said opening of the tank so as to attach the member to the fixing bracket, the fixing bracket further having a support portion extending from the base portion and supporting the member in a state in which the position of the member is offset from the opening of the tank.

BRIEF DESCRIPTION OF THE DRAWINGS

FIG. 2 is a perspective view of the fixing bracket;
FIG. 3 is a sectional view of the fuel tank that shows the state in which the fuel gauge is attached;
and
FIG. 4 is a sectional view of another embodiment that corresponds to FIG. 3.

DETAILED DESCRIPTION OF THE PREFERRED EMBODIMENTS

Figure 3:
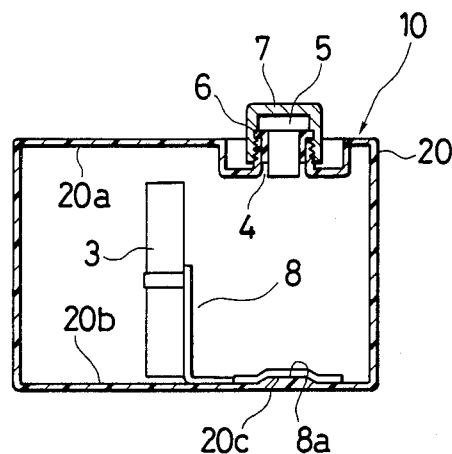

In FIG. 3, the tank body 20 of a fuel tank 10 for motor vehicles is formed by flow molding from a resin such as high density polyethylene, and a service opening 4 is provided on its top wall 20a.

In the service opening 4, a lid 5 is arranged to be tightened via a packing 6 by a cap 7, as in the prior-art construction. At a position which is nearly directly below the service opening 4 on the bottom wall 6, there is formed a protrusion 20c for positioning a fixing bracket 8. Fixing bracket 8 is adapted to support a fuel gauge 3, which is one of the functional internal parts that will be described later.

Figure 1:
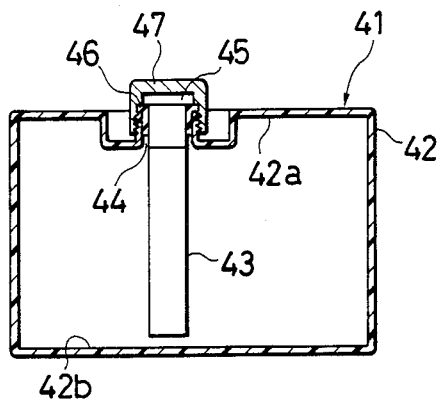
FIG. 1 is a sectional view of a prior-art fuel tank.
Figure 2:
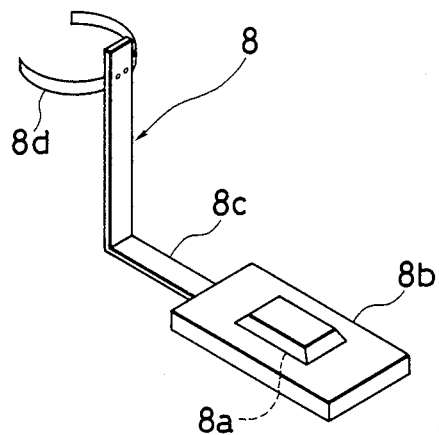
FIGS. 2 to 4 show embodiments of the present invention where

As shown in FIG. 2, the fixing bracket 8 consists of a base unit 8b made of similar resin as the tank body 20 that is equipped with the protrusion 20c, and an L-shaped metallic holder unit 8c which is molded to the base unit 8b. On the tip of the holder unit 8c, there is attached with bolts or the like a hand unit 8d for holding the fuel gauge 3. The holder unit 8c has a transverse length that corresponds to the offset between the attaching position of the fuel gauge 3 and the protrusion 20c of the tank body 20, and has a strength and a rigidity that are sufficient for holding the fuel gauge 3.

In fitting the structure, the fixing bracket 8 is inserted through the service opening 4 of the fuel tank 10, and the base unit 8b of the fixing bracket 8 is positioned on the bottom wall 20b of the tank body 20 by engaging the indention 8a of the base unit 8b with the protrusion 20c of the tank body 20. Then, the base unit 8b is secured as a unitary body to the bottom wall 20b of the tank body 20 by, for example, welding with an ultrasonic welding apparatus (not shown).

Next, the fuel gauge 3 is inserted through the service opening 4 to elastically attach it to the hand unit 8d in the holder unit 8c of the fixing bracket 8, and the service opening 4 is blocked with the lid 5 and the cap 7 by the use of the packing 6, completing the attaching work.

Accordingly, the welding work attaching for the fixing bracket 8 to the tank body 20 can be carried out with ease, since the base unit 8b of the fixing bracket 8 may also be positioned nearly directly beneath the service opening 4. Also, the fuel gauge 3 can easily be attached to an optimum position which may be offset fom the service opening 4. Further, the holding unit 8c can be made of a metal so that sufficient rigidity for supporting the fuel gauge 3 can be secured.

Moreover, since the bottom surface reference which is can be adapted as the gauge reference for the fuel gauge 3, a higher gauging accuracy can be attained in comparison to the top surface reference, even if there is a disparity in the dimensions of the fuel tank.

The fuel gauge 3 installed in the above manner can be detached easily by reversing the procedure, so that the serviceability in the inspection and maintenance can also be improved.

Figure 4:
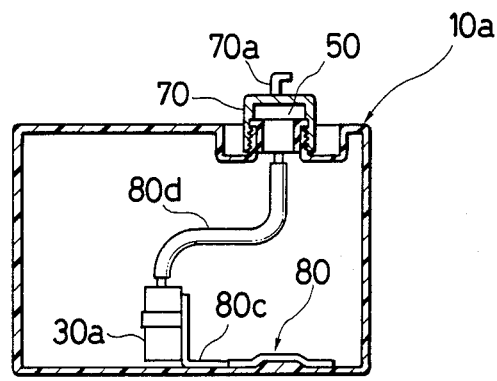

Another embodiment shown in FIG. 4 illustrates a feed pump attached as a functional internal part of the fuel tank 10a. In the embodiment, a holder unit 80c of a fixing bracket 80 is molded to match the pump body 30a, the pump body 30a and a lid 50 are connected to each other by a tube 80d, and fuel delivery is arranged to be carried out through an outport 70a that is provided on a cap 70.

It is to be noted that although the embodiments of the present invention are described in conjunction with the fuel gauge and the feed pump as the functional internal parts of the fuel tank, the present invention is by no means limited only to these cases. Thus, the functional internal parts may be, for example, a separator or other kind.

As described in the foregoing, according to the present invention, in a fuel tank that has a service opening on its top wall, a fixing bracket for the functional internal parts to be fixed on the inside of the fuel tank is installed and has a a holder unit made of metal for attaching the functional internal parts, and the base unit of the fixing bracket is welded to the bottom wall of the tank at a position which is substantially directly beneath the service opening. The present invention facilitates the attachment of functional internal parts and, moreover, makes it possible to attach the functional internal parts even when their fixing positions are offset to a high degree from the service opening. Therefore, a degree of freedom can be secured for setting the positions of the functional internal parts, to their optimum positions within given restrictions. As a result, it becomes possible to fully utilize the functional internal parts in the fuel tank.

What is claimed is:

1. A structure for supporting a member in a tank made of resin and having an opening in the upper wall thereof, comprising:

a fixing bracket having a base portion and a support portion, said base portion being made of resin and secured to a bottom wall of the tank generally just below the opening of the tank, said base portion having a recessed portion fitted onto a projection in the bottom wall of the tank, and said support portion extending from said base portion and adapted to support the member in a position offset from the opening of the tank.

2. A structure for supporting a member in a tank as claimed in claim 1, wherein said member comprises a fuel gauge for detecting the fuel level within the tank.

3. A structure for supporting a member in a tank as claimed in claim 1 wherein said member comprises a feed pump for pumping the fuel within the tank into the outside of the tank through a tube connected to the feed pump and a port disposed in a lid for capping the opening of the tank.

4. A structure for supporting a member in a tank made of resin and having an opening in an upper wall thereof, comprising:

fixing bracket having a base portion and a support portion, said base portion being made of resin and secured to a bottom wall of the tank generally just below the opening of the tank, said base portion having a recessed portion fitted onto a projection in the bottom wall of the tank and said support portion having a holder portion connected to said base portion and a hand portion for attaching the member thereto, whereby the member can be supported in a position offset from the opening of the tank.

5. A structure for supporting a member in a tank as claimed in claim 4, wherein the member comprises a fuel gauge for detecting the fuel level within the tank.

6. A structure for supporting a member in a tank as claimed in claim 4, wherein the member comprises a feed pump for pumping the fuel within the tank into the outside of the tank through a tube connected to the feed pump and a port disposed in a lid for capping the opening of the tank.

* * * * *